(12) United States Patent
Vallier

(10) Patent No.: US 8,800,199 B1
(45) Date of Patent: Aug. 12, 2014

(54) FOSSORIAL ANIMAL CONTROL PRODUCT

(76) Inventor: Heather Vallier, Arroyo Grande, CA (US)

( * ) Notice: Subject to any disclaimer, the term of this patent is extended or adjusted under 35 U.S.C. 154(b) by 138 days.

(21) Appl. No.: 13/052,737

(22) Filed: Mar. 21, 2011

Related U.S. Application Data

(60) Provisional application No. 61/316,558, filed on Mar. 23, 2010.

(51) Int. Cl.
*A01M 17/00* (2006.01)

(52) U.S. Cl.
USPC .......................................... 43/124

(58) Field of Classification Search
CPC .................. A01M 17/00; A01M 2200/011
USPC .................. 43/121, 124, 131, 132.1; 119/712
IPC ......................................... A01M 17/00
See application file for complete search history.

(56) References Cited

U.S. PATENT DOCUMENTS

| | | | |
|---|---|---|---|
| 293,470 | A | 2/1884 | Johnson |
| 3,816,610 | A | 6/1974 | Lusby |
| 3,935,099 | A | 1/1976 | Weaver et al. |
| 3,981,100 | A | 9/1976 | Weaver et al. |
| 3,997,484 | A | 12/1976 | Weaver et al. |
| 5,058,311 | A | 10/1991 | Erickson |
| 5,109,628 | A | 5/1992 | Ellefson |
| 5,853,848 | A | 12/1998 | Fisk |
| 6,558,684 | B1 | 5/2003 | Sutherland |
| 6,800,712 | B2 | 10/2004 | Doane et al. |
| 7,009,020 | B2 | 3/2006 | Doane et al. |
| 7,423,090 | B2 | 9/2008 | Doane et al. |
| 2008/0236037 | A1 | 10/2008 | Rose et al. |
| 2010/0093535 | A1 | 4/2010 | Rose et al. |
| 2013/0019813 | A1* | 1/2013 | Rubin et al. ............... 119/712 |

OTHER PUBLICATIONS

Absorbant Technologies, Zeba for Farms, Aug. 4, 2007 (Two Attachements, Zeba article and Internet Archive for Date of article).*
Tramfloc, Inc., Aug. 20, 2002.*
Gopher Goo, Brochure, Vallier, H., Jul. 29, 2009, see attached Internet Archive Record.

* cited by examiner

*Primary Examiner* — David Parsley
*Assistant Examiner* — Timothy Schwarz
(74) *Attorney, Agent, or Firm* — SoCal IP Law Group LLP; Mark A. Goldstein

(57) ABSTRACT

A fossorial animal control product and related methods are disclosed herein. The fossorial animal control product is a non-toxic and biodegradable super absorbent polymer combined with a compost agent. The fossorial animal control product is disposed in a fossorial animal burrow. When hydrated and allowed a sufficient amount time to expand, the fossorial animal control product obstructs the entrance to the burrow, a portion of the burrow or substantially fully obstructs burrow. The fossorial animal control product releases water and nutrients over time within the burrow. This assists flora proximate to the burrow that were damaged by fossorial animal activity to recover. Use of the fossorial animal control product also fills ground surface voids created by fossorial animals thus reducing trip hazards commonly encountered in playgrounds or sporting facilities.

16 Claims, 2 Drawing Sheets

US 8,800,199 B1

FOSSORIAL ANIMAL CONTROL PRODUCT

CROSS-REFERENCE TO RELATED APPLICATIONS

This application is a non-provisional application which takes benefit and priority under 35 U.S.C. §119(e) from U.S. provisional application Ser. No. 61/316,558 filed Mar. 23, 2010 to the instant inventor. The aforementioned provisional patent application is hereby incorporated by reference as if fully set forth herein.

FEDERALLY SPONSORED RESEARCH AND DEVELOPMENT

Not Applicable

COPYRIGHT NOTICE

Not Applicable

RELEVANT FIELD

This application is directed generally toward fossorial animal control and more specifically toward a water activated obstruction formed within a burrow of the fossorial animal.

RELEVANT ART OVERVIEW

Fossorial animals for example, gophers, moles, rabbits, ground squirrels, skunks, prairie dogs, ground hogs, etc. create subterranean burrows which present trip hazards in school yards and athletic fields. In some instances, fossorial animals may also feed upon flora extending within the burrow or in proximity thereto. These feeding habits may damage or kill the flora thus resulting in significant time and expense to remove, replace and replant suitable flora. In a commercial context, this could mean the difference between a commercially successful enterprise and economic collapse particularly when replacement flora requires years before commercial crop production become available.

Current fossorial animal control methods include trapping, fumigation and poisoning of the animals. Each of these methods has its advantages and disadvantages with poisoning being the least desirable as society moves away from toxic measures for animal control. However, none of these methods address the burrow left behind by the fossorial animal. The vacant burrow is subject to repopulation, collapse and remains a trip hazard to both people and domestic animals. Accordingly, there is a need in the relevant art to provide a method which both displaces the fossorial animal from its burrow and refills the burrow to minimize collapse and trip hazards.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

In view of the foregoing, various exemplary embodiments of a fossorial animal control product and method of use are described herein. In one exemplary embodiment, a super absorbent polymer having non-toxic and biodegradable properties is provided for application within a burrow of the fossorial animal. In an exemplary embodiment, the super absorbent polymer is a starch based polymer cross-linked with an alkali metal, typically potassium. Upon absorption of water, the super absorbent polymer expands 300-700 times from its original size forming a viscous gelatinous plug within the burrow. In a preferred exemplary embodiment, the viscous property of the gelatinous plug adheres to the fur or skin of the fossorial animal which is an annoyance and hindrance to animals that discourages their attempts to reclaim the burrow filled with the super absorbent polymer.

In another exemplary embodiment, the super absorbent polymer is dry mixed in a granular form with a water soluble compost agent. When hydrated, the compost agent forms a nutrient solution absorbable by the super absorbent polymer. A portion of the nutrient solution becomes absorbed into the gelatinous matrix during hydration and is released over time due to biodegradation of the gelatinous matrix. The unabsorbed nutrients from the compost agent are immediately bioavailable to flora to assist in recovery from damage caused by the fossorial animal(s).

In an exemplary embodiment, the fossorial animal control product described above may be used by simply disposing an effective amount of the fossorial animal control product within an entrance of the burrow followed by application of a quantity of water and allowing a sufficient amount of time for the fossorial animal control product to absorb at least a portion of the water to form a gelatinous matrix which plugs at least the entrance of the burrow or alternately, premixing an effective amount of the fossorial animal control product with water to form a slurry which is then poured into the entrance of the burrow. The plug which forms from the expanded super absorbent polymer provides a physical barrier which obstructs the entrance of the burrow and discourages fossorial animals from repopulating the burrow. The plug also serves to minimize trip hazards and the potential of the burrow collapsing. Nutrients and water released due to biodegradation of the super absorbent polymer assists flora in recovery from damage produced by fossorial animal activity.

BRIEF DESCRIPTION OF DRAWINGS

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described exemplary embodiments without departing from the true scope and spirit of the inventive embodiments described herein and as is defined by the claims.

DETAILED DESCRIPTION

Various exemplary embodiments of a fossorial animal control product and method of use are described herein. In the following detailed description, numerous specific details are set forth in order to provide a thorough understanding of the present inventive embodiments. It will be apparent, however, to one skilled in the art that the present inventive embodiments may be practiced without these specific details. In other instances, well-known structures, devices or compositions may be shown in block diagram form in order to avoid unnecessarily obscuring the present inventive embodiments.

Figure 1:
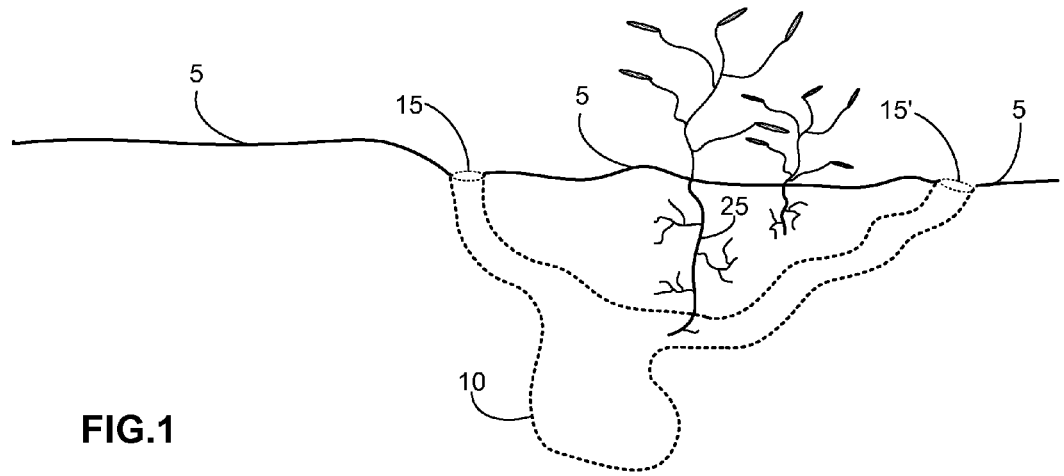
FIG. 1—depicts an unobstructed fossorial animal burrow in accordance with an exemplary embodiment.

Referring to FIG. 1 an exemplary unobstructed fossorial animal burrow 10 is depicted. A ground surface 5 is interrupted by two entrances 15, 15' in which a fossorial animal may access/egress the burrow 10. Flora 25 in which the fossorial animal may be feeding upon is shown extending into the burrow 10. The burrow entrances 15, 15' may represent a trip hazard to persons or domesticated animals traversing the ground surface 5.

A typical burrow 10 of a fossorial animal such as gopher includes tunnels and one or more chambers in which the animal may reside. Depending on the type of fossorial animal, the size, shape, depth and lateral extent of the burrow 10 will vary. Accordingly, traditional control methods may require multiple attempts at dislodging or eradicating a fossorial animal.

Figure 1A:
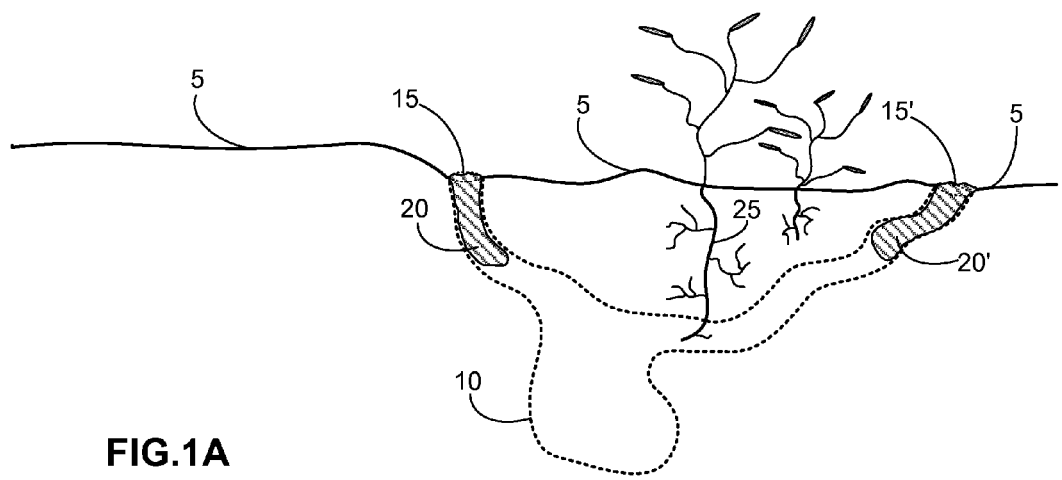
FIG. 1A—depicts a partially obstructed fossorial animal burrow in accordance with an exemplary embodiment.

Referring to FIG. 1A, an exemplary partially obstructed fossorial animal burrow 10 is depicted. In this exemplary embodiment, identified entrances 15, 15' into the burrow 10 are treated with a fossorial animal control product 20, 20'. The fossorial animal control product 20, 20' comprises a super absorbent polymer which when hydrated expands to volumetrically fill the burrow entrances 15, 15', thus preventing the fossorial animal from accessing and/or egressing the burrow 10. The fossorial animal control product 20, 20' is typically provided in a granular form which may be directly poured into the burrow entrances 15, 15' and hydrated using water supplied by a garden hose or other water source.

In an alternate exemplary embodiment, a quantity of fossorial animal control product 20, 20' may be pretreated with water in a separate container such as bucket to form a slurry which is then poured into the burrow entrances 15, 15'. Once the slurry is disposed in the burrow entrances 15, 15', additional water may be added to fully expand the super absorbent polymer contained in the fossorial animal control product 20, 20' to volumetrically fill the burrow entrances 15, 15'. The quantity of super absorbent polymer 20, 20' required to volumetrically fill the burrow entrances 15, 15' will vary depending on the diameter of the burrow entrances 15, 15', slope of the burrow 10 and mineral content of the water used to hydrate the super absorbent polymer contained in the fossorial animal control product 20, 20'.

A "typical" treatment using the fossorial animal control product 20, 20' for a burrowing rodent (e.g., ground squirrel or gopher) is at least 225 grams per burrow entrance 15, 15'. In a preferred embodiment, the super absorbent polymer contained in the fossorial animal control product 20, 20' is a hydro gel formed from Starch-g-poly (2-propenamide-co-propenoic acid cross-linked with potassium.) The super absorbent polymer forms a gelatinous matrix during hydration which swells anywhere from 300-700 times its dehydrated size and plugs the burrow entrances 15, 15', thus discouraging burrow repopulation and also eliminating the trip hazards of the open burrow entrances. The absorption properties of the super absorbent polymer vary considerably depending on the mineral content of the water used to hydrate the polymer; however, absorption of about 1000:1 by weight is typical. Accordingly, to fully hydrate a gram of super absorbent polymer, at least 50 milliliters of water may be required.

In practice, the quantity of water required may be less depending on the volume of the burrow entrances 15, 15' to be obstructed.

The gelatinous matrix includes a viscous property which adheres to the fur and/or skin of the animal. The adhered gelatinous material is both an annoyance and hindrance to the animal which discourages the animal from attempting to reclaim the burrow plugged with the fossorial animal control product 20, 20'. The adhered gelatinous material interferes with the animal's natural burrowing actions by disturbing its nap of fur and allows soil/debris to adhere to the fur which is difficult for the animal to remove.

The super absorbent polymer contained in the fossorial animal control product 20, 20' is non-toxic and slowly biodegrades, releasing water which becomes bioavailable to flora 25 in proximity to the fossorial animal control product 20, 20'. The super absorbent polymer is commercially available from Absorbent Technologies, Inc., 8705 SW Nimbus Avenue, Beaverton, Oreg. 97008 and sold under the trade name of ZEBA®. Alternately, other polyacrylamide/polyacrylate copolymer salts may be substituted for Starch-g-poly preferably cross-linked with potassium or ammonium rather than sodium.

In another preferred embodiment, the fossorial animal control product 20, 20' is dry mixed with granulated compost in a volumetric ratio of about two parts super absorbent polymer to one part granulated compost. The addition of granulated compost provides immediate and time released nutrients to flora 25 which allows for a more rapid recovery from root damage caused by certain fossorial animals (e.g., gophers). The granulated compost is at least partially water soluble which allows a portion of a nutrient solution to be absorbed into the super absorbent polymer and released over time along with water as the super absorbent polymer biodegrades within the burrow 10. The granulated compost may be obtained from a variety of commercial vendors, for example, Natural Nutrient Solutions, P.O. Box 140818 Garden City, Id. 83714 and marketed under the trade name of Poopeas™. The combination of super absorbent polymer and compost agent assists injured flora to recover more rapidly by providing nutrients and hydration to a potentially compromised root system.

In another exemplary embodiment, an annoyance odorant may be added to the fossorial animal control product 20, 20' to further discourage attempts by animals to repopulate the burrow 10. For example, peppermint is known to be an unpleasant odor to gophers. Accordingly, addition of trace concentrations of peppermint oil or other odorants may be added to the fossorial animal control product 20, 20' in order to repel and/or discourage attempts by animals to repopulate the burrow 10.

Figure 1B:
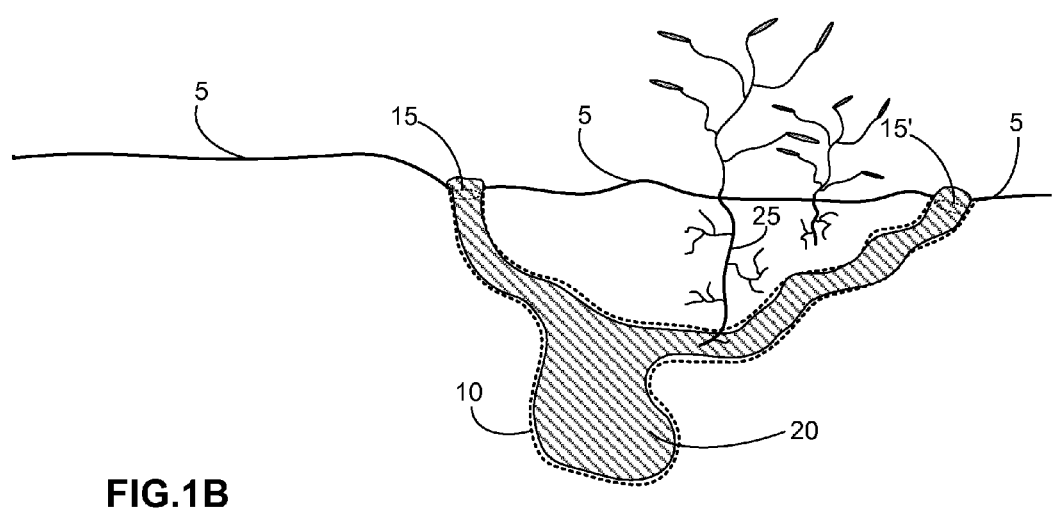
FIG. 1B—depicts a fully obstructed fossorial animal burrow in accordance with an exemplary embodiment.

Referring to FIG. 1B, an exemplary fully obstructed fossorial animal burrow 10 is depicted. In this exemplary embodiment, identified entrances 15, 15' and the entire burrow 10 are treated with the fossorial animal control product 20. This exemplary embodiment requires a sufficient quantity of the fossorial animal control product 20 to volumetrically fill the entire burrow and/or substantial portions thereof. There are several advantages to implementing this exemplary embodiment. For example, by volumetrically filling the entire burrow 10, fossorial animals are unable to repopulate the burrow 10 by simply digging around the gelatinous plugs formed at the burrow entrances 15, 15' as discussed above.

Another advantage of fully occluding the fossorial animal burrow 10 is the fossorial animal control product 20 provides structural support to the former burrow 10 which minimizes the chances of the burrow 10 collapsing. A third advantage of fully occluding the fossorial animal burrow 10 is that water and nutrients are made bioavailable to flora 25 in proximity to the entire area of the burrow 10.

Figure 2:
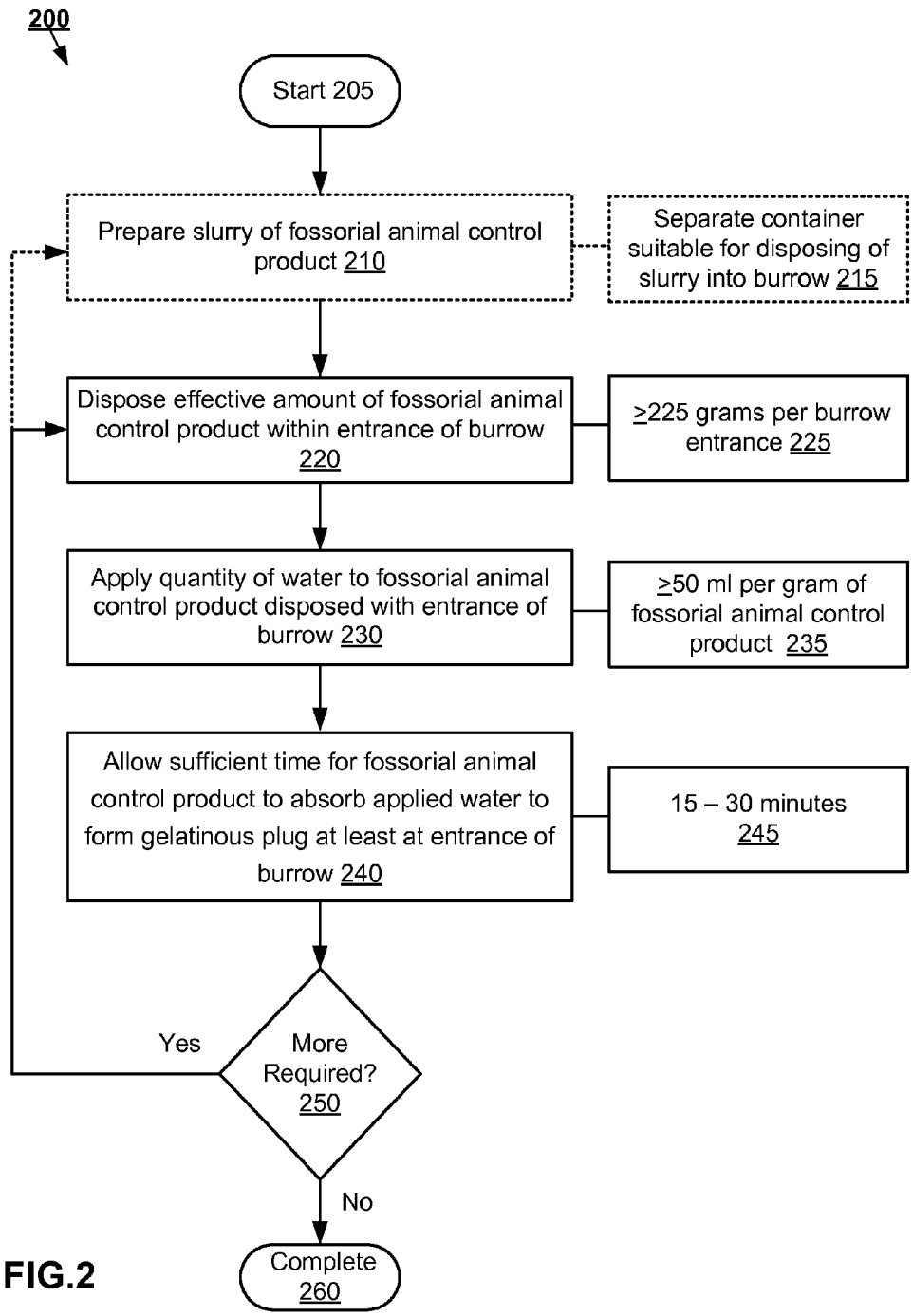
FIG. 2—depicts a flow chart of a method for treating a fossorial animal burrow in accordance with an exemplary embodiment.

Referring to FIG. 2, an exemplary flow chart of a method 200 for treating a fossorial animal burrow 10 is depicted. The method 200 starts 205 at block 210 by optionally preparing a slurry of the fossorial animal control product 20 in a separate container (e.g., bucket). The slurry of the partially hydrated fossorial animal control product 20 may be then be poured from the container directly into the burrow entrance(s) 15, 15' (FIG. 1). The separate container should be suitable for disposing of the slurry into a burrow entrance of the fossorial animal 215.

At block 220 an effective amount of the fossorial animal control product 20 is disposed within the entrance(s) of the burrow 15, 15'. The effective amount is at least 225 grams per burrow entrance 225. At block 230, the disposed fossorial animal control product 20 is hydrated by application of a quantity of water. The quantity of water required is highly variable but generally will require at least 50 milliliters of water per gram of fossorial animal control product 235.

At block 240, a sufficient amount of time is allowed for the fossorial animal control product 20 to absorb the applied water to form a gelatinous plug at least at entrance(s) of the burrow 15, 15'. The sufficient amount of time is approximately 15-30 minutes 245 for volumetric expansion of the super absorbent polymer contained in the fossorial animal control product 20. At decision block 250, a user determines whether additional fossorial animal control product 20 is required. For example, if at least the entrance(s) 15, 15' of the burrow 10 remains at least partially unobstructed, additional fossorial animal control product 20 may be disposed and steps 220-250 (optionally 210) repeated until at least the entrance(s) 15, 15' of the burrow 10 are fully obstructed. Once at least the entrance(s) 15, 15' of the burrow 10 are fully obstructed, the method is completed 260.

The various exemplary inventive embodiments described herein are intended to be merely illustrative of the principles underlying the inventive concept. It is therefore contemplated that various modifications of the disclosed embodiments will without departing from the inventive spirit and scope be apparent to persons of ordinary skill in the art. They are not intended to limit the various exemplary inventive embodiments to any precise form, mixture ratio or application sequence described. In particular, different super absorbent polymers, compost agents, treatment times and/or quantities may vary from those described herein. No specific limitation is intended to the operating sequences described herein. Other variations and inventive embodiments are possible in light of the above teachings, and it is not intended that the inventive scope be limited by this specification, but rather by the Claims following herein.

What is claimed is:

1. A method of using a fossorial animal control product, the product comprising:
   a water soluble compost agent; and
   a super absorbent polymer having non-toxic and biodegradable properties;
   the method comprising:
   a. disposing an effective amount of the fossorial animal control product within a portion of a burrow,
   b. applying a quantity of water to the fossorial animal control product in the burrow such that the fossorial animal control product absorbs a portion of the applied water to expand and occlude the portion of the burrow, including the super absorbent polymer forming a gelatinous matrix,
   c. repeating actions a. and b. until the burrow is substantially fully obstructed;
   wherein the hydrated fossorial animal control product provides nutrients and water within the burrow, prevents fossorial animals from repopulating the burrow, renders nutrients from the compost agent immediately bioavailable and in a time released manner proximate to the burrow and provides structural support to the burrow, including filling ground surface voids;
   wherein the gelatinous matrix has a viscous property that discourages attempts by fossorial animals to reclaim the filled burrow.

2. The method of claim 1 wherein the water soluble compost agent is provided in a predefined mixing ratio with the super absorbent polymer.

3. The method of claim 2 wherein the predefined mixing ratio is approximately two parts super absorbent polymer to one part compost agent by volume.

4. The method of claim 1 wherein the water soluble compost agent is an organic nutrient compound which when dissolved in water forms a nutrient solution absorbable by the super absorbent polymer.

5. The method of claim 1 wherein the super absorbent polymer exhibits a volumetric expansion ratio in a range of 300-700 to 1 following absorption of water.

6. The method of claim 1 wherein the gelatinous matrix swells from 300 to 700 times a dehydrated size of the super absorbent polymer.

7. The method of claim 1 wherein the fossorial animal control product comprises a dry granular mixture of the super absorbent polymer and the water soluble compost agent.

8. The method of claim 1 wherein the quantity of water is applied in a ratio of at least 20 milliliters per gram of fossorial animal control product.

9. The method of claim 1 wherein the applying the quantity of water to the fossorial animal control product in the burrow includes allowing a sufficient amount of time for the fossorial animal control product to absorb at least a portion of the water to form the gelatinous matrix, wherein the sufficient amount of time is approximately 15-30 minutes.

10. The method of claim 1 wherein the effective amount is at least 225 grams per burrow.

11. The method of claim 1 wherein the repeating proceeds until the entire burrow is fully obstructed.

12. A method of using a fossorial animal control product, the fossorial animal control product comprising:
   a water soluble compost agent, and
   a super absorbent polymer having non-toxic and biodegradable properties;
   the method comprising:
   preparing a slurry of the fossorial animal control product with water, including the super absorbent polymer forming a gelatinous matrix,
   disposing an effective amount of the slurry within a portion of the burrow wherein the slurry expands to occlude the portion of the burrow,
   repeating the disposing until the burrow is volumetrically filled;
   wherein the slurry provides nutrients and water within the burrow, prevents fossorial animals from repopulating the burrow, renders the water and the nutrients from the compost agent immediately bioavailable and in a time released manner to flora proximate to the burrow and provides structural support to the burrow, including filling ground surface voids; wherein the gelatinous matrix has a viscous property that discourages attempts by fossorial animals to reclaim the filled burrow.

13. The method of claim 12 wherein the water soluble compost agent is provided in a predefined mixing ratio with the super absorbent polymer.

14. The method of claim 12 wherein the predefined mixing ratio is approximately two parts super absorbent polymer to one part compost agent by volume.

15. The method of claim 12 wherein the super absorbent polymer is 2-propenamide-co-propenoic acid cross-linked with potassium.

16. The method of claim 12 wherein the gelatinous matrix swells from 300 to 700 times a dehydrated size of the super absorbent polymer following absorption of water.

* * * * *